United States Patent Office 3,449,663
Patented June 10, 1969

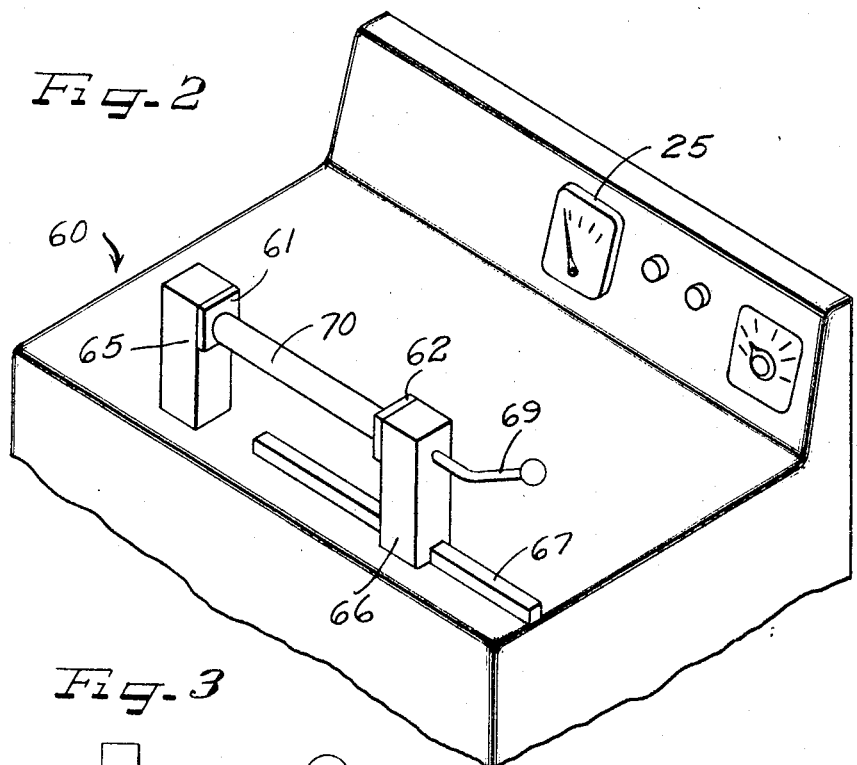
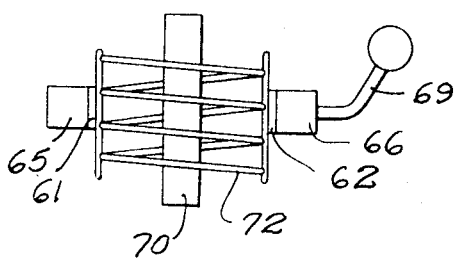
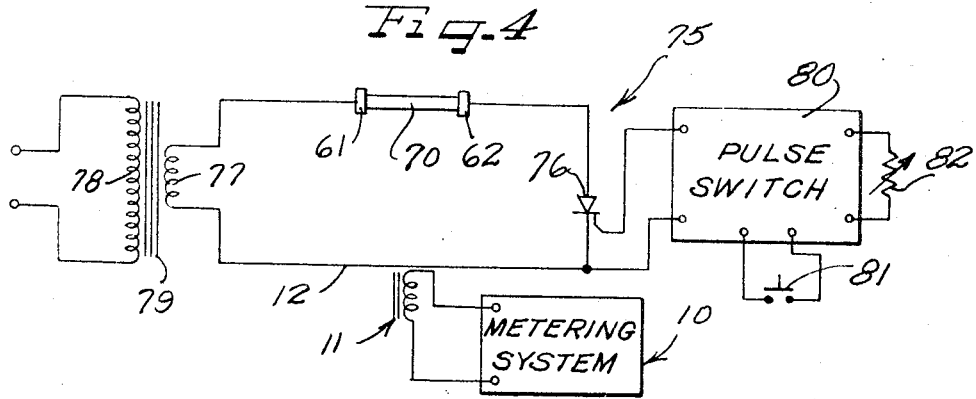

3,449,663
MAGNETIC TESTING SYSTEM CURRENT
MEASURING DEVICE
Kenneth W. Schroeder, Arlington Heights, and Bruce G.
Isaacson, Chicago, Ill., assignors to Magnaflux Corporation, a corporation of Delaware
Filed Apr. 10, 1964, Ser. No. 358,783
Int. Cl. G01r 33/12
U.S. Cl. 324—38                         1 Claim

ABSTRACT OF THE DISCLOSURE

A magnetic particle inspection system with a device for measuring the amounts of magnetization by the system of a test part therein, including means for applying a series of high amperage uni-directional current pulses to the part to magnetize it, sensing coil means for developing low voltage signals proportional to the amplitude of said current pulses, means for rectifying the voltage signals and transmitting them to storage means, where they are added in stores, and measuring means for indicating the value of the stored voltage. If the saturation point of the test part is not reached, the magnetization of the part is approximately proportional to the value of the stored voltage signals, and can be determined with the device of this invention.

---

This invention relates generally to a pulse meter system for measuring high amperage current with a high degree of accuracy, reliability and efficiency while using components which are of comparatively small size and weight and relatively inexpensive, and more particularly to a pulse meter system which will accurately measure such currents although they exist for a very short period of time. The system is, however, usable to measure continuous currents such as AC or half-wave rectified AC currents.

Although various features of the invention have other applications, the invention is illustrated herein as applied to a system wherein a part is magnetized to produce localized fields in the region of defects, such localized fields being then detected by distributing magnetic particles over the surface of the part to be attracted and accumulated by said localized fields so as to provide a visual indication of the location of defects. In this application, it is essential that the current applied to such part under test be known and quickly monitored to assure uniform testing of a series of parts.

The part may be magnetized either by passing a high amperage current therethrough, or by passing a current through a conductor or coil within, adjacent to or in surrounding relation to the part. In testing parts of magnetizable materials, it is possible to apply a high amperage current to the part, the conductor or the coil for only a short interval of time, to produce a remanent magnetization of the part, after which it may be inspected. Difficulties are, however, encountered in applying a high amperage current of known amplitude for a short interval of time.

According to an important feature of the invention, an inductive device is provided including a winding on a core of magnetic material which is placed adjacent to a conductor which carries the current to be measured, the device being operative to develop low voltage signal in response to high current in the conductor. The device is not affected substantially by core saturation and obviates a disadvantage of current transformers commonly empolyed.

Another important feature of this invention resides in a signal detector means wherein the low voltage signal is stored in a capacitor. According to this feature, the storage capacitor has a low resistance storage path and a high resistance discharge path in a metering system, such paths being preferably provided by means of a series blocking diode and a parallel high resistance. This feature enables the metering system to be operative for a much longer period of time than the duration of the high amperage current applied thereto.

A still further feature of the invention is in a means for eliminating extraneous signals such as transients, from the metering system, preferably in the form of a loading resistor connected across the winding of the inductive device.

This invention contemplates other objects, features and advantages which will become more fully apparent from the following detailed description taken in conjunction with the accompanying drawings which illustrate preferred embodiments and in which:

FIGURE 2 is a perspective view of a magnetic testing apparatus with which the metering system of this invention may be used, a mode of testing being illustrated wherein current is passed through a part under test;

Figure 1:
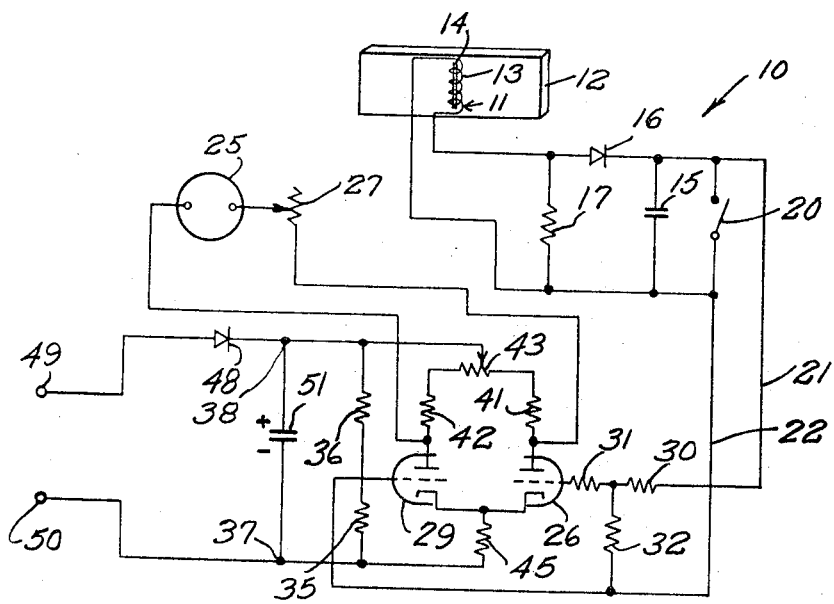
FIGURE 1 is an electrical circuit diagram of a high amperage current metering system which is constructed in accordance with the principles of this invention.
Figure 5:
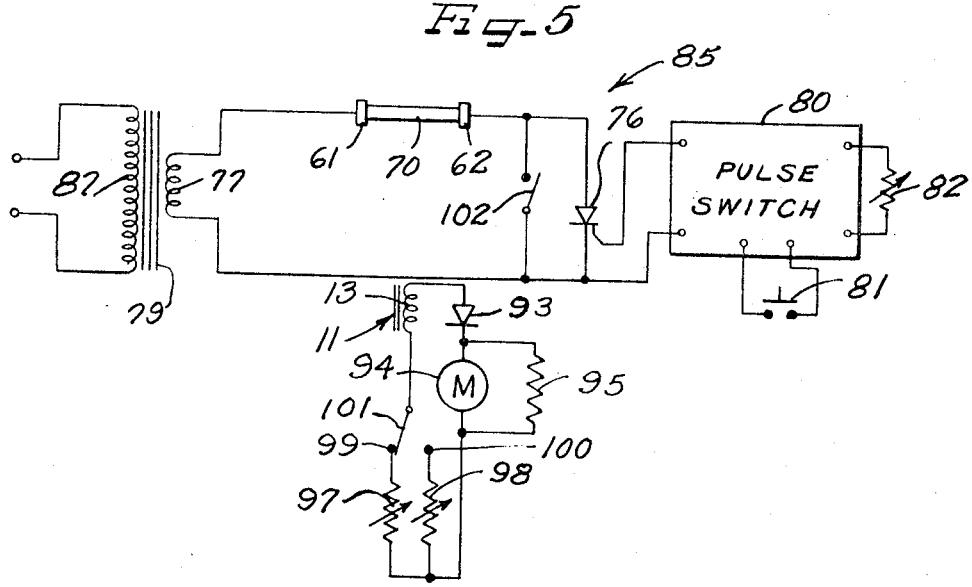

FIGURE 3 illustrated the use of an auxiliary test coil for the apparatus of FIGURE 2, to obtain another mode of operation wherein current is passed through the coil to develop a field which is applied to the part;

FIGURE 4 is a schematic electrical diagram for the apparatus of FIGURE 2, showing the use of the metering system of FIGURE 1 in the apparatus of FIGURE 2; and FIGURE 5 shows a modified form of metering system constructed according to this invention.

The metering system, shown in FIGURE 1, is generally designated by reference numeral 10 and has a current sensor 11 inductively coupled to a bus bar as conductor 12, for converting high amperage current signals to a low voltage signal. The current sensor 11 comprises a winding 13 on a core 14 of magnetic material which is placed generally transverse to the direction of flow of current in the conductor 12. An open magnetic circuit is thus provided and effects which might otherwise be produced due to saturation are minimized.

A storage capacitor 15 has one lead connected to one lead to the sensor 11 and the other lead connected to the sensor 11 through a diode 16. A resistor 17 is connected across the sensor 11 and serves to suppress extraneous signals such as transient oscillations. As reset switch 20 is connected between a line 21 and and a line 22 which are also connected to the end terminals of capacitor 15.

When a high amperage current passes through the conductor 12, the coil 13 of the current sensor 11 will have induced in it a voltage which is proportional to the high amperage current. This voltage is then applied to the charging capacitor 15 through the blocking diode 16. The blocking diode 16 prevents the capacitor 15 from discharging through the sensor 11 and resistor 17, thereby causing the capacitor 15 to discharge slowly through the conductors 21 and 22 into a pulse metering circuit having a high input impedance as described hereinafter.

The pulse metering system 10 includes a meter 25 connected to an anode of a triode 26 through a variable resistor 27 and directly connected to an anode of a second triode 29. Both triodes 26 and 29 may be in the same envelope. The line 21 is connected to the control grid of the triode 26 through a pair of resistors 30 and 31, while the line 22 is connected through a resistor 32 to the junction between resistors 30 and 31 and is also connected to the control grid of the triode 29 and through resistors 35 and 36 to circuit points 37 and 38 forming negative and positive DC supply terminals.

A pair of resistors 41 and 42 are connected between the anodes of triodes 26 and 29 and the ends of a potentiometer 43 having a movable contact connected to the circuit point 38. The cathodes of triodes 26 and 29 are connected through a resistor 45 to circuit point 37.

To supply a DC voltage to circuit points 37 and 38, a rectifier 48 is connected between circuit point 38 and an AC supply terminal 49, a second AC supply terminal 50 being connected directly to circuit point 37. A filter capacitor 51 is connected between circuit points 37 and 38.

In operation, the variable resistor 43 is adjusted to place the anodes of the triodes 26 and 29 into equal potentials when capacitor 15 is discharged, thereby causing no indication in the meter 25. When a high amperage current flows through the conductor 12, the capacitor 15 is charged up to a value corresponding to the effective peak value of the current. The control grid of the triode 26 will then be placed at a positive potential relative to the potential of the control grid of the triode 29, the triode 26 will conduct more than the triode 29, and a current will pass through the meter 25 proportional to the voltage across the capacitor 15. The resistors in the circuit, particularly the resistor 32, have values which are quite high, and through the action of the triodes and through the use of the unbipassed cathode resistor 45, a very high input impedance is provided in parallel relation to the capacitor 15. Accordingly, after an input current of short duration is applied to the circuit, the current through the meter 25 will remain quite stable, long enough to enable the operator to read it with a high degree of accuracy.

To prevent the meter reading obtained from one operation from effecting the meter reading from a subsequent operation, the reset switch 20 is closed after each reading to completely discharge the capacitor 15 prior to the next measurement.

A preferred use of the metering system of this invention is illustrated in FIGURE 2 which shows a magnetic particle test unit generally designated by reference numeral 60 and comprising a pair of current contactor electrodes 61 and 62 having parallel facing surfaces. The current electrode 61 is secured to a stationary head stock 65, while the current electrode 62 is secured to a movable tailstock 66, which is locked into a desired position along a guide rail 67 by means of a locking arm 69. The guide rail 67 is then electrically connected to the contact or electrode 62 and serves as a conductor for supply of current thereto.

A part 70 can be tested for longitudinal defects by placing it between the two current electrodes 61 and 62 thereupon it will be secured in place by sliding the movable tail stock 66 in a manner as to clamp the part 70 between the current electrodes 61 and 62. A magnetizing current, of predetermined amplitude, is passed from the current electrode 61 through the part 70 into the current electrode 62, thereby causing a circular magnetic field about the longitudinal axis of the part 70. A longitudinal defect in the part 70 will cause an irregularity in the circular magnetic field in the area of the defect, and will produce a localized field which will attract magnetic particles which are applied to the part 70, and produce a clearly visible concentration of the particles along the defect. The particle may preferably be applied in a fluid suspension, but may also be applied in dry form.

To test the part 70 for transverse defects, a magnetizing coil 72 (FIGURE 3) is placed between the current electrodes 61 and 62 and is secured in a manner as described above one end of the coil being electrically connected to the head stock contact 61 and the other end of the coil being electrically connected to the tail stock contact 62. A magnetizing current is passed from the current electrode 61 through the coil 72 and into the current electrode 62, thereby causing a magnetic field to be produced along the axis of the coil 72. When the part 70 is placed into the center of the coil 72 the magnetic field thereof will travel longitudinally through the part 70, after which particles are applied to show the location of defects.

FIGURE 4 shows a preferred circuit 75 for the unit 60, operable to apply high amperage current signals of controllable duration and with characteristics such as to obtain a high remanent magnetization of a magnetizable part, and with a metering system that will monitor such high amperage current signals with a high degree of uniformity and reliability.

The pulse circuit comprises a silicon controlled rectifier 76, having an anode connected to the current electrode 62 and a cathode connected to one lead of a secondary winding 77 of a transformer 79 having a primary winding 78. The current electrode 61 is connected to the other lead of the secondary winding 77, and to the current electrode 62 through the part 70 or through the coil 72. A pulse switch 80 has output terminals connected to the gate and cathode electrodes of the silicon controlled rectifier 76, and operates after closing of a start switch 81 to apply a control signal having a duration controlled by adjustment of a resistor 82. By way of example, the control signal duration is adjustable from 0.04 to 0.5 second. Metering system 10, which is used to measure the magnetizing current has the current sensor 11 located in close proximity to the conductor 12 which is between the secondary winding 77 and the cathode of the rectifier 76.

In operation, alternating current is applied to the primary winding 78 of the transformer 79 to induce a voltage in the secondary winding 77. However, no magnetizing current will flow until a control signal from the pulse switch 80 is applied to the silicon controlled rectifier 76. When a control signal is applied to the silicon controlled rectifier 76, magnetizing current will flow through the silicon controlled rectifier during the positive half cycles of the alternating current, and the exact amount thereof will be indicated by the metering system 10.

When the control signal is terminated at a time determined by the variable resistor 82, the silicon controlled rectifier 76, if non-conductive because of a negative half cycle will remain non-conductive. However, if the silicon controlled rectifier 26 is conductive it will remain conductive during the complete positive half cycle.

It is noteworthy that with the pulse metering system of this invention applied to the magnetizing circuit as illustrated an indication of the amplitude of current passing through the magnetizing circuit will be obtained even though such current may flow for a comparatively short period of time.

FIGURE 5 shows a modified current measuring system 85 applied to a magnetic particle test unit of the type described above.

In this modified form of the invention, the coil 13 of the device 11 has one terminal connected through a diode 93 to one terminal of a meter 94 shunted by a resistor 95, the other terminal of the meter being connected through adjustable resistors 97 and 98 to terminals 99 and 100 selectively engageable by a contact 101 which is connected to the other terminal of the coil 13.

Resistors 97 and 98 are for the purpose of calibrating the circuit, resistors 97 being adjusted to calibrate the circuit for half-wave operation and resistor 98 being adjusted to calibrate the circuit for sinusoidal AC operation.

In this modified circuit, the storage feature of the circuit of FIGURE 1 is not utilized. However, the circuit is simpler, and will accurately measure currents, particularly half-wave or sinusoidal AC currents which flow continuously or for a substantial length of time.

Thus resistor 82 may be adjusted to obtain current flow for a comparatively long period of time, or the controlled diode 76 may be replaced by a simple diode having no control electrode. For continuous AC current, the diode 76 may be shunted by closing a switch 102 connected thereacross.

It will be appreciated, of course, that the circuit could be adjusted to accurately measure currents having wave forms other than half-wave or sinusoidal form.

We claim as our invention:

1. In a system for magnetic particle inspection of a test part, means for applying one or more high amperage, uni-directional current pulses through the part for magnetization thereof, said means including conductor means for carrying said high amperage current, means for supporting said part for application of magnetic particles thereto, current sensing means including a straight core of magnetic material adjacent said conductor means and generally transverse to the direction of current flow in said conductor means, said straight core having a length approximately the same as a transverse dimension of said conductor means and being so arranged as to provide an open magnetic circuit and to minimize effects which might otherwise be produced due to saturation, winding means on said core for developing a low voltage signal proportional to said high amperage current, a loading resistor connected across said winding means to minimize transient variations in said low voltage signal, storage capacitor means, means including a diode for defining a low impedance charging path from said winding means to said storage capacitor means, and means for measuring the stored low voltage signal of said storage capacitor means.

References Cited

UNITED STATES PATENTS

| | | | |
|---|---|---|---|
| 2,217,733 | 10/1940 | De Forest | 324—38 |
| 1,929,714 | 10/1933 | Reich | 324—127 X |
| 2,132,267 | 10/1938 | Lord | 324—127 |
| 2,139,474 | 12/1938 | Shepard. | |
| 2,300,198 | 10/1942 | Brown | 324—102 |
| 2,709,800 | 5/1955 | Temple | 324—127 X |
| 3,251,014 | 5/1966 | Stein | 324—127 X |

RUDOLPH V. ROLINEC, *Primary Examiner.*

ALFRED E. SMITH, *Assistant Examiner.*